US009292116B2

United States Patent
Mann et al.

(10) Patent No.: US 9,292,116 B2
(45) Date of Patent: Mar. 22, 2016

(54) CUSTOMIZING OPERATION OF A TOUCH SCREEN

(71) Applicant: N-trig Ltd., Kfar-Saba (IL)

(72) Inventors: Eytan Mann, Modiln (IL); Ilan Geller, Pardesia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 13/682,779

(22) Filed: Nov. 21, 2012

(65) Prior Publication Data

US 2013/0127757 A1     May 23, 2013

Related U.S. Application Data (60) Provisional application No. 61/561,935, filed on Nov. 21, 2011.

(51) Int. Cl.
*G06F 3/041*     (2006.01)
*G06F 3/044*     (2006.01)

(52) U.S. Cl.
CPC ............. *G06F 3/041* (2013.01); *G06F 3/044* (2013.01); *G06F 3/0416* (2013.01); *G06F 2203/04106* (2013.01)

(58) Field of Classification Search
CPC ........... G06F 1/30; G06F 1/161; G06F 3/048; G06F 3/044; G06F 3/04883; G06F 3/03545; G06F 2203/04104; G06F 3/0416; G06F 2203/04808; G06F 3/041; G06F 3/0412; G06F 3/046; G06F 2203/04806; G06F 2203/04108; G06F 2203/04106; G06F 3/017; G06F 3/033; G06F 3/0418; G06F 3/0488; G06F 3/038
USPC .......................................... 345/174, 173, 157
See application file for complete search history.

(56) References Cited

U.S. PATENT DOCUMENTS

| | | | |
|---|---|---|---|
| 5,396,635 | A | 3/1995 | Fung |
| 5,670,755 | A | 9/1997 | Kwon |
| 7,292,229 | B2 | 11/2007 | Morag et al. |
| 7,353,413 | B2 | 4/2008 | Dunstan |
| 7,372,455 | B2 | 5/2008 | Perski et al. |

(Continued)

FOREIGN PATENT DOCUMENTS

WO    WO 2013/076725     5/2013

OTHER PUBLICATIONS

International Search Report and the Written Opinion Dated Mar. 19, 2013 From the International Searching Authority Re. Application No. PCT/IL2012/050470.

(Continued)

*Primary Examiner* — Aneeta Yodichkas
*Assistant Examiner* — Chineyere Wills-Burns (57) ABSTRACT

A method for customizing operation of a digitizer system operated with an electronic device is described, the electronic device including software applications. The method includes operating the digitizer system in a first mode of operation, the first mode of operation defined by a plurality of operating parameters, receiving instructions for adjusting one or more operating parameters of the digitizer system, wherein the instructions are defined by a software application, the software application operative to receive input from the digitizer system, and updating operation of the digitizer system responsive to the instructions defined by the software applications.

31 Claims, 3 Drawing Sheets

(56) References Cited

U.S. PATENT DOCUMENTS

| | | |
|---|---|---|
| 7,843,439 B2 | 11/2010 | Perski et al. |
| 8,289,289 B2 | 10/2012 | Rimon et al. |
| 8,291,243 B2 | 10/2012 | Castelli et al. |
| 2005/0028007 A1* | 2/2005 | Hashiguchi ........ G06Q 20/3674 726/4 |
| 2006/0012580 A1* | 1/2006 | Perski .................... G06F 3/038 345/173 |
| 2007/0242056 A1* | 10/2007 | Engelhardt ........... G06F 3/0416 345/173 |
| 2007/0262964 A1* | 11/2007 | Zotov .................... G06F 3/0416 345/173 |
| 2008/0062148 A1 | 3/2008 | Hotelling et al. |
| 2009/0027334 A1* | 1/2009 | Foulk ................. G06F 3/04886 345/157 |
| 2009/0251434 A1* | 10/2009 | Rimon ..................... G06F 1/30 345/173 |
| 2011/0012853 A1 | 1/2011 | Chang et al. |
| 2011/0163976 A1 | 7/2011 | Barnhoefer et al. |
| 2012/0235949 A1* | 9/2012 | Ligtenberg ............ G06F 1/1616 345/174 |
| 2012/0280929 A1* | 11/2012 | Rimon ..................... G06F 1/30 345/173 |

OTHER PUBLICATIONS

International Preliminary Report on Patentability Dated Jun. 5, 2014 From the International Bureau of WIPO Re. Application No. PCT/IL2012/050470.

Supplementary European Search Report and the European Search Opinion Dated Jul. 8, 2015 From the European Patent Office Re. Application No. 12851144.1.

\* cited by examiner

CUSTOMIZING OPERATION OF A TOUCH SCREEN

RELATED APPLICATION

This application claims the benefit of priority under 35 USC 119(e) of U.S. Provisional Patent Application No. 61/561,935 filed Nov. 21, 2011, the contents of which is incorporated herein by reference in its entirety.

FIELD OF THE INVENTION

The present invention, in some embodiments thereof, relates to touch screens and more particularly, but not exclusively, to controlling operation of a touch screen.

BACKGROUND OF THE INVENTION

Touch screens are commonly used as input devices for a variety of electronic products and for a variety of different applications. Touch screens are known to allow a user to interact with an electronic product in more intuitive and versatile manner as compared to other known input devices. Touch screens can be used for example to select virtual buttons displayed on the screen, to manipulate size and position of displayed objects, to enter data with a virtual keyboard, virtual number pad and/or by handwritten input, to open a document or application, to scroll within a window, to draw and/or to play games.

Some touch screens additionally or alternatively support stylus detection. Styluses may be particularly useful for applications that require touch detection with higher resolution such as drawing applications and/or applications that require handwritten input. Some applications are specifically geared toward receiving input from a stylus such as for example security applications that require a user to provide a handwritten signature. At times, usage of a stylus is a personal preference. Known styluses include passive styluses that may be powered by the electronic device and/or active styluses that may be battery powered.

Touch screens are often used for operating portable devices, such as Personal Digital Assistants (PDA), tablet PCs, wireless flat panel displays (FPD) screens, laptop computers, smart phones and other devices. Since these portable devices are typically battery-powered, power management techniques are typically employed to prolong the battery life of these devices. Known power management techniques include for example screen blanking while the screen is not being used and/or hibernating one or more input/output devices while they are not being used.

U.S. Pat. No. 7,843,439 entitled "Touch Detection for a Digitizer" assigned to N-Trig Ltd., the contents of which is incorporated herein by reference, describes a detector for detecting both a stylus and touches by fingers or like body parts on a digitizer sensor. The detector typically includes a digitizer sensor with a grid of sensing conductive lines, a source of oscillating electrical energy at a predetermined frequency, and detection circuitry for detecting a capacitive influence on the sensing conductive line when the oscillating electrical energy is applied, the capacitive influence being interpreted as a touch. The detector is capable of simultaneously detecting multiple finger touches and/or stylus touch.

U.S. Pat. No. 8,289,289 entitled "Multi-Touch and Single Touch Detection" the contents of which is incorporated herein by reference, describes a touch detection system and method for selectively applying a first touch detection method over a first selected part of a touch sensitive sensor and a second touch detection method over a second selected part of the same touch sensitive sensor. It is described that positions and sizes of the first and second selected parts of the touch sensitive sensor can be set in accordance with an application being used or dynamically defined or changed during operation of the application.

U.S. Pat. No. 5,396,635 entitled "Power conservation apparatus having multiple power reduction levels dependent upon the activity of the computer system" the contents of which is incorporated herein by reference, describes a method and apparatus for power management in a computer. A power conservation system of the computer has a plurality of states of operation including an ON state, a DOZE state, a SLEEP state and an OFF state. An activity monitor monitors the activity of the computer system and generates control signals for selecting one of the states of operation for the computer system. During periods of inactivity, power consumption is reduced, for example, by reducing clock speeds or removing clocks, and/or by removing power, and/or by controlling the refresh frequency to memory.

SUMMARY OF THE INVENTION

According to an aspect of some embodiments of the present invention there is provided a touch screen whose operation is dynamically dictated by a host electronic device and a method for dynamically customizing operation of the touch screen. In some exemplary embodiments, customization is responsive to application requirements, battery life and/or user preference. Optionally, dynamically controlling operation of the touch screen provides for improving performance of the touch screen and/or for prolonging battery life.

An aspect of some embodiments of the present invention provides for a method for customizing operation of a digitizer system operated with an electronic device, the electronic device including software applications, the method comprising: operating the digitizer system in a first mode of operation, the first mode of operation defined by a plurality of operating parameters; receiving instructions for adjusting one or more operating parameters of the digitizer system, wherein the instructions are defined by a software application, the software application operative to receive input from the digitizer system; and updating operation of the digitizer system responsive to the instructions defined by the software applications.

Optionally, the instructions defined by one software application operative to receive input from the digitizer system is different than the instructions defined by another software application operative to receive input from the digitizer system.

Optionally, the instructions defined by a software application change during an operating session of the software application and wherein operation of the digitizer system is updated responsive to the changes.

Optionally, the software application is selected from a group consisting of: word processing application, drawing application, gaming application, internet browsing application, e-mail application, spreadsheet application, navigation application, data processing application, social networks application, phone dialing application, messaging application, security and/or signature verification application, handwriting recognition application, translation application, data consuming or processing application, image processing or displaying application, audio processing or playing application, video processing or playing application, electronic books application, news application and price comparison application.

Optionally, the software application is a power management application.

Optionally, the digitizer system includes a digitizer sensor formed from a plurality of conductive lines spread over a sensing surface and wherein the digitizer system is operative to alter a routine for triggering the conductive lines of the digitizer sensor responsive to the instructions defined by the software application.

Optionally, the digitizer system is operative to alter a refresh rate of the digitizer system responsive to the instructions defined by the software application.

Optionally, the digitizer system is operative to toggle between activating or suspending activation of a processing routine for processing sampled data responsive to the instructions defined by the software application.

Optionally, the processing routine is selected from a group including: gesture detection, smoothing algorithms and palm detection.

Optionally, the digitizer system is operative to activate one or more of stylus detection and fingertip detection responsive to the instructions defined by the software application.

Optionally, the digitizer system is operative to activate single touch detection or multi-touch detection responsive to the instructions defined by the software application.

Optionally, the digitizer system is operative to activate a processing routine for detection of up to a predefined number of simultaneous fingertip touches responsive to the instructions defined by the software application.

Optionally, the digitizer system is operative to toggle between activating and suppressing hover detection of one or more of stylus or fingertip responsive to the instructions defined by the software application.

Optionally, the digitizer system is operative to alter number of bits used for sampling analog output responsive to the instructions defined by the software application.

Optionally, the digitizer system is operative to alter resolution of the digitizer system responsive to the instructions defined by the software application.

Optionally, the software application is operative to learn a parameter characterizing how a user operates with the digitizer system and to define the instructions responsive to the parameter learned.

Optionally, the digitizer system is operated with a mobile phone or a smart phone.

An aspect of some embodiments of the present invention provides for an electronic device including a host computer, electronic display and digitizer system, the electronic device comprising: a controller associated with the host computer that receives instructions for adjusting one or more operating parameters of the digitizer system, the instructions defined by a software application, the software application running on the host computer; a controller for operating the digitizer system, the controller operative to operate the digitizer system in a first mode of operation and to updating operation of the digitizer system responsive to the instructions defined by the software application; and an interface medium for communicating instructions defined by a software application to the controller of the digitizer system.

Optionally, the electronic device includes a memory having stored thereon at least two software applications, each defining the one or more operating parameters of the digitizer system, wherein at least one of the operating parameters defined by one of the at least two software applications is different than that defined by the other of the at least two software applications.

Optionally, the software application is selected from a group consisting of: word processing application, drawing application, gaming application, internet browsing application, e-mail application, spreadsheet application, navigation application, data processing application, social networks application, phone dialing application, messaging application, security and/or signature verification application, handwriting recognition application, translation application, data consuming or processing application, image processing or displaying application, audio processing or playing application, video processing or playing application, electronic books application, news applications and price comparison application.

Optionally, the software application is a power management application.

Optionally, the digitizer system includes a digitizer sensor formed from a plurality of conductive lines spread over a sensing surface and wherein the controller for operating the digitizer system is operative to alter a routine for triggering the conductive lines of the digitizer sensor responsive to the instructions defined by the software application.

Optionally, the controller for operating the digitizer system is operative to alter a refresh rate of the digitizer system responsive to the instructions defined by the software application.

Optionally, the controller for operating the digitizer system is operative to toggle between activating or to suspending activation of a processing routine for processing sampled data responsive to the instructions defined by the software application.

Optionally, the processing routine is selected from a group including: gesture detection, smoothing algorithms and palm detection.

Optionally, the controller of the digitizer system is operative to activate one or more of stylus detection and fingertip detection responsive to the instructions defined by the software application.

Optionally, the controller of the digitizer system is operative to activate one of single touch detection or multi-touch detection responsive to the instructions defined by the software application.

Optionally, the controller of the digitizer system is operative to activate a processing routine for detection of up to a predefined number of simultaneous fingertip touches responsive to the instructions defined by the software application.

Optionally, the controller of the digitizer system is operative to toggle between activating and suppressing hover detection of one or more of stylus or fingertip responsive to the instructions defined by the software application.

Optionally, the controller of the digitizer system is operative to alter number of bits used for sampling analog output responsive to the instructions defined by the software application.

Optionally, the controller digitizer system is operative to alter resolution of the digitizer system responsive to the instructions defined by the software application.

Optionally, the electronic device is a mobile phone or a smart phone.

Unless otherwise defined, all technical terms used herein have the same meaning as commonly understood by one of ordinary skill in the art to which the invention pertains. In case of conflict, the patent specification, including definitions, will control. In addition, the materials, methods, and examples are illustrative only and are not intended to be necessarily limiting. Although other methods and materials similar or equivalent to those described herein can be used in the practice or testing of embodiments of the invention, some exemplary methods and/or materials are described below.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to touch screens and more particularly, but not exclusively, to controlling operation of a touch screen.

Touch screens are known to be used as an input device for interfacing with a plurality of different software applications executed by a single electronic device. For example, a touch screen can be used to interface with a word processing application, spreadsheet application, drawing application, phone dialing application, and/or gaming application, all running on a single portable computing device. The present inventors have found that different software applications may typically have different requirements when interfacing with the touch screen. For example, some software applications may support multi-touch detection while others may only support single touch detection. In addition, the maximum number of simultaneous touches that need to be identified may differ for different applications. In another example, some software applications support both finger touch and stylus input, while others support only stylus or only finger touch. Optionally, one or more parameters for operating with the stylus or with the touch may also be defined by the software application.

The present inventors have also found that differences in requirements can extend, for example to parameters including the refresh rate required, the latency that can be tolerated, the smoothing between interaction points that is required. For example a phone dialing application may require a different refresh rate, e.g. a lower refresh rate than a gaming application. In addition smoothing between interacting points might have low priority for a phone dialing application. A drawing application, on the other hand, may prefer more smoothing at the expense of lower refresh rate or higher power consumption. Differences in requirements may also exist within a same software application. For example, the requirements for using a touch screen to interface with a virtual keyboard may be different than those required while a user is entering free-style text. The virtual keyboard and the free-style entry may be features that are used in common software application.

The present inventors have found that the touch screen's performance as well as its power management can be improved by dynamically adjusting one or more parameters for operating the touch screen based on requirements of an active application. Optionally, one or more parameters for operating the touch screen are also dynamically adjusted while an application is active, based on a current requirement of the application, e.g. responsive to displaying a virtual keyboard and/or to switching to a drawing mode.

According to some embodiments of the present invention there is provided a medium for software application providers to dictate one or more parameters for operating the touch screen while the software application is active. Typically, a default operation mode is defined and the touch screen operates in a default setting unless otherwise instructed by a control unit associated with and/or in communication with the touch screen. Optionally, a touch screen reverts to the default setting when the software application is closed or changes setting responsive to activation of another software application and/or if the setting requested by the application is incompatible with the touch sensor.

According to some embodiments of the present invention there is provided a method of improving performance and/or power management of a touch screen by dynamically adjusting parameters for operating the touch screen on a per need basis. In some exemplary embodiments, power management is improved by adjusting the processing power required on a per need basis. In some exemplary embodiments, the parameters are adjusted responsive to needs of a software application. Optionally and/or additionally, the parameters are adjusted responsive to needs of a particular user. Optionally and/or additionally, the parameters are adjusted responsive to a battery charge level. In some exemplary embodiments, the needs are dictated by a software provider. Optionally and/or additionally, the needs are determined over a learning process. Optionally and/or additionally, the needs are determined responsive to user selection.

Figure 1:
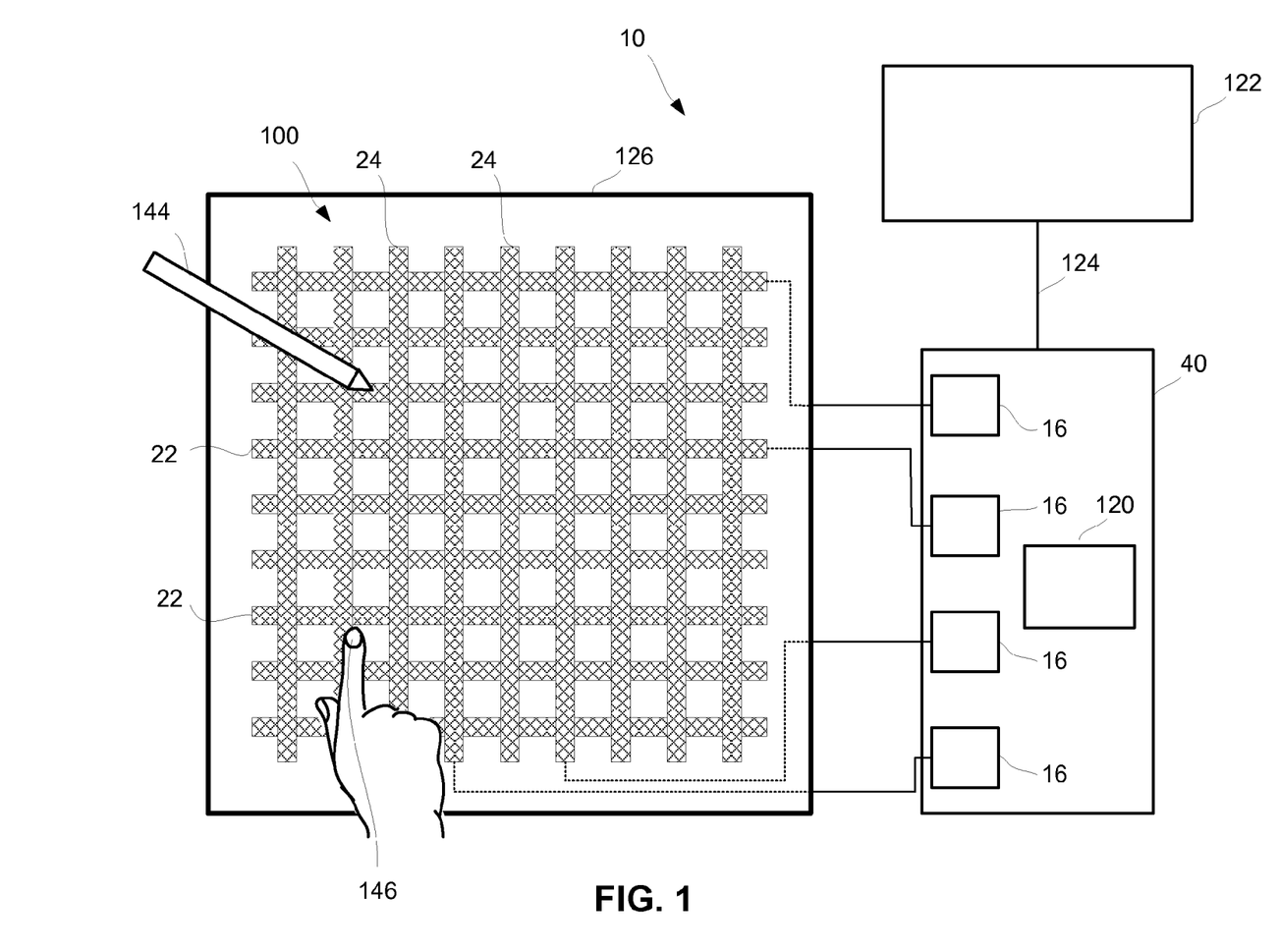
FIG. 1 is a simplified block diagram of an exemplary digitizer system that can be used with at least some embodiments of the present invention.
Figure 2:
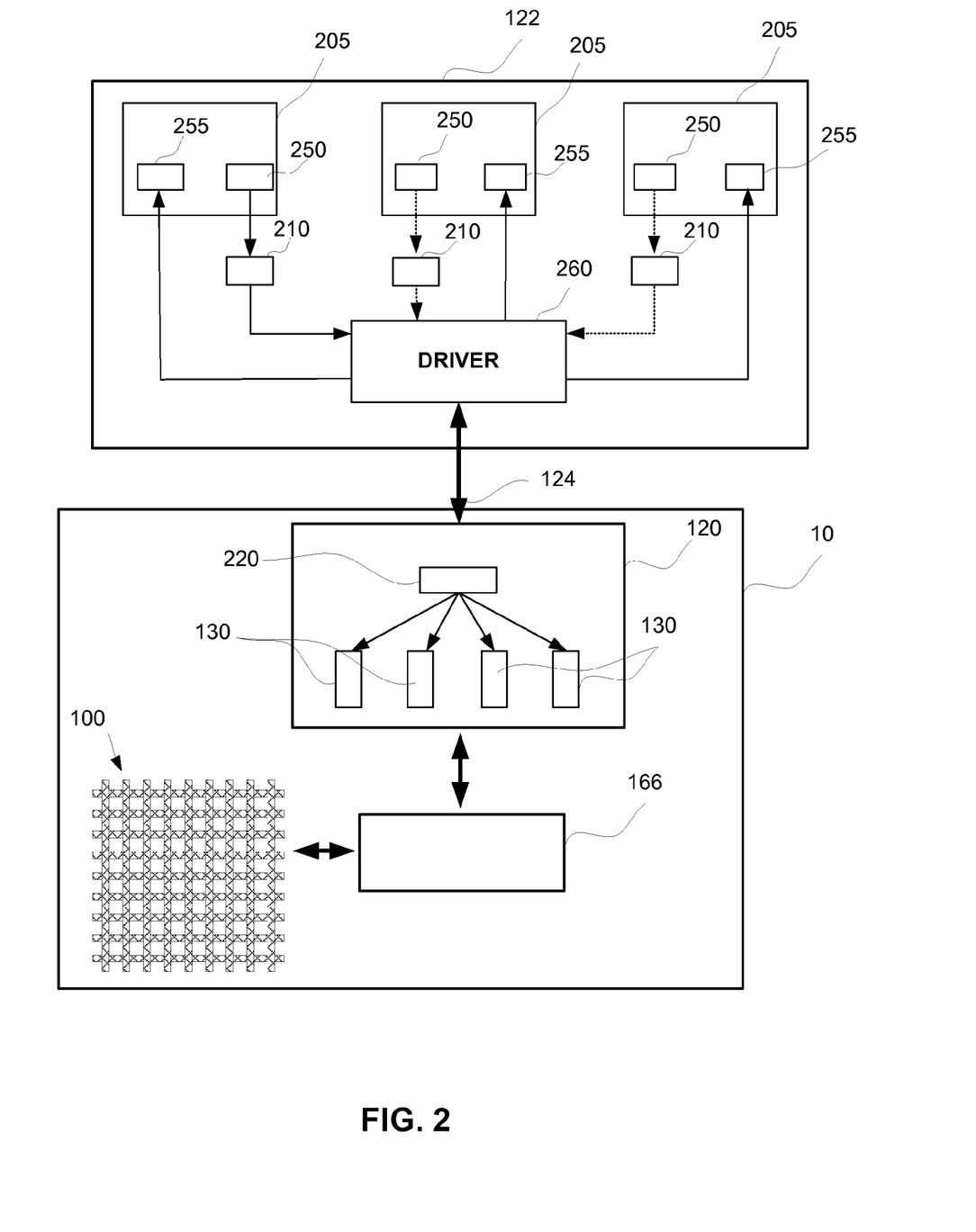
FIG. 2 is a simplified block diagram of an exemplary interface between a digitizer system and host computer for dynamically customizing operation of the digitizer system in accordance with some embodiments of the present invention.
Figure 3:
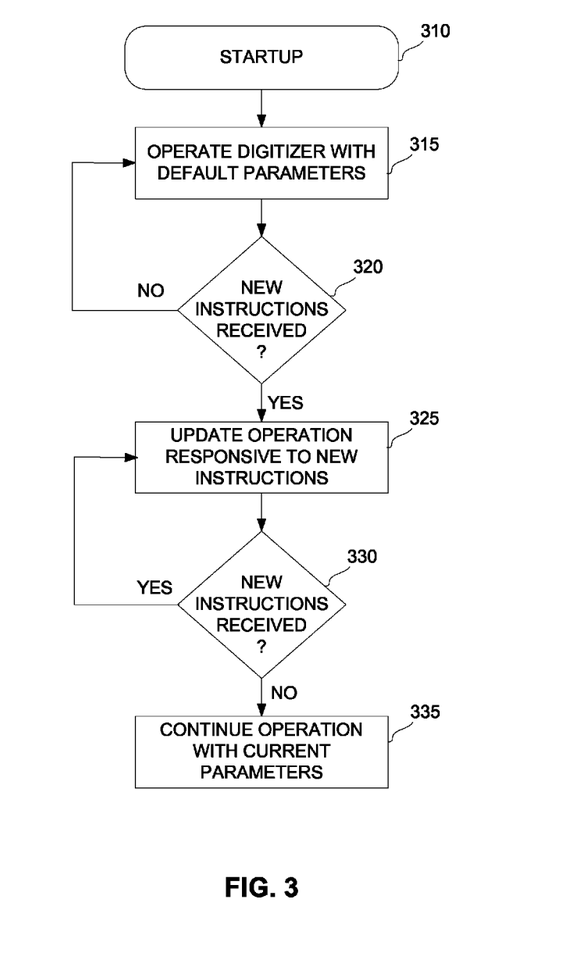
FIG. 3 is a simplified flow chart of an exemplary method for dynamically customizing operation of a touch screen in accordance with some embodiments of the present invention.

For purposes of better understanding some embodiments of the present invention, as illustrated in FIGS. 2-3 of the drawings, reference is first made to the construction and operation of a digitizer system and/or touch screen as illustrated in FIG. 1. Digitizer system 10 is an exemplary digitizer system and can be used with some embodiments of the present invention. Digitizer system 10 may be suitable for any computing device that enables touch and/or hover input between a user and the device, e.g. mobile and/or desktop and/or tabletop computing devices that include, for example, FPD screens. Examples of such devices include Tablet PCs, touch or pen enabled lap-top computers, tabletop computers, smartphones, mobile phones, PDAs, hand held devices that facilitate electronic gaming, or any other touch enabled computing platforms. Typically, digitizer system 10 includes a sensor 100, e.g. a capacitive touch sensor including a patterned arrangement of strips and/or conductive lines, also referred to as antennas, which is optionally transparent, and which is typically overlaid on a FPD 126. Typically sensor 100 is a grid based sensor including horizontal conductive lines 22 and vertical conductive lines 24 forming a first and second axis. Typically, sensor 100 overlaid on FPD 126 forms the touch screen.

Circuitry for operating sensor 100 typically includes one or more ASICs 16 positioned on one or more PCB(s) 40 and connected to inputs or outputs of the various conductive lines 22 and/or 24. Typically, ASICs 16 function to process the received signals at a first processing stage, e.g. for noise removal and to sample the sensor's output into a digital representation. The digital output signal can then be forwarded to a digital unit 120, e.g. digital ASIC unit also on PCB(s) 40, for further digital processing. Typically, digital unit 120 receives the sampled data from ASIC 16, reads the sampled data, further processes the data and determines and/or tracks the position of physical objects, such as stylus 144 or finger 146. Optionally, hovering of stylus 144 and finger 146 are also detected and processed by digital unit 120. Typically, digital unit 120 calculates position, and/or tracking information. Optionally, digital unit 120 performs additional smoothing based on a plurality of detection points to generate tracking information sent to a host computer 122 via interface 124. Optionally, digital unit 120 performs additional processing for example to provide gesture recognition, to perform palm rejection, to determine a stylus identification code and/or a stylus mode of operation. Optionally, such processed information is also sent to a host computer 122 via interface 124. Typically, host computer 122 includes memory for storing parameters, protocols, data and/or instructions for communicating with digital unit 120 for operating digitizer system 10. According to some embodiments of the present invention, interface 124 additionally provides for transmitting data, e.g. commands and/or instructions from host 122 to digital unit 120 for altering operation and/or a current mode of operation of digitizer system 10.

According to some embodiments of the present invention, digital unit 120 together with ASIC 16 serves as the controller of digitizer system 10 and/or has functionality of a controller and/or processor. Typically, digitizer system, e.g. digital unit 120 includes memory for storing firmware and/or software, one or more operational parameters, look-up tables, calibration maps or other instructions or data for operating sensor 100. Typically, the refresh rate of digitizer system 10 is set and/or controlled by digital unit 120. Output from sensor 100 is forwarded to a host 122 via an interface 124 for processing by the operating system or any running application. Optionally, at least part of the processing described to be performed by digital unit is performed instead by host 122.

Typically, detection of touch by a fingertip 146, e.g. finger touch detection is facilitated when sending a triggering pulse to one or more of the conductive lines. Typically, the triggering pulse is produced and sent by digital unit 120. Triggering pulses and/or signals are analog pulses and/or oscillating signals, e.g. having frequencies in the range of 1-1000 KHz. In response to triggering, amplitude of the signal within the bandwidth is examined to detect interaction by fingertip 146.

Digitizer system 10 can operate in self-capacitance mode, e.g. single touch mode for detecting a single fingertip interaction, and/or in mutual-capacitance mode for detecting simultaneous fingertip touches. In single touch mode, all the conductive lines 22 and/or 24 can be triggered simultaneously and position of touch can be determined in response to the simultaneous triggering of all the conductive lines. In multi-touch mode, scanning is typically required so position of each of the plurality of fingertip touches can be discerned. During scanning conductive lines along one axis are triggered one at a time (or in groups where each line in a group is triggered with a different frequency) and in response to each triggering, outputs from the conductive lines along the other axis are sampled. Outputs responsive to each triggering are examined to detect interaction by one or more fingertips 146. Optionally, the scanning can then be repeated on the conductive lines of the other axis. Due to the repeated triggering and sampling events required for multi-touch detection, multi-touch mode is known to be a much more process heavy mode as compared to the single touch mode. In addition, the latency period associated with the multi-touch mode for reporting touch is typically higher and the maximum achievable refresh rate is typically lower as compared to the single touch mode.

In addition to fingertip touch detection, digitizer system 10 can also receive input from a stylus 144. Stylus 144 may interact with sensor 100 by emitting a signal, e.g. in the form of a series of pulses that can be picked up by one or more conductive lines 22 and 24. Triggering the conductive lines is typically not required for stylus detection. Typically a frequency of a signal emitted by stylus 144 is set to be distinguishable from the triggering signal used for finger detection. According to some embodiments of the present invention, the refresh rate for stylus detection can be set to be different than the refresh rate for detecting finger touch.

A digitizer system similar to digitizer system 10 is described with further details, for example in incorporated U.S. Pat. No. 7,843,439, U.S. Pat. No. 7,372,455 and U.S. Pat. No. 7,292,229, the contents of which is incorporated herein by reference. It is appreciated that the present invention is not to be limited to the technical description of the digitizer system and methods for detection described herein. The present invention may also be applicable to other digitizer system depending on their construction and/or to other methods for detection with a touch screen.

Reference is now made to FIG. 2 showing a simplified block diagram of an exemplary interface between a digitizer system and a host computer for dynamically customizing operation of the digitizer system in accordance with some embodiments of the present invention. According to some embodiments of the present invention, one or more software applications 205 installed on or executed by host computer 122 include API calls 250 linked with a protocol 210 for providing instructions for operating digitizer system 10 and/ or an API for receiving input from digital unit 120. Optionally, software application 205, API 255, API calls 250 and protocol 210 are stored in a remote location and communicated to host 122 through a server.

According to some embodiments of the present invention, one or more applications 205 provide API 255 that can be used by digital unit 120 to send messages to one or more applications 205. Optionally, digitizer unit 120 sends traps or asynchronous messages via driver 260 to each application 205 that subscribed to messages of the relevant type. Optionally messages from digital unit 120 may refer, for example to internal operating states of the digitizer system, battery state, or the like.

According to some embodiments of the present invention, protocol 210 defines commands related to one or more operational parameters and/or operational modes for operating digitizer system 10, to be sent responsive to requirements of the software application and/or responsive to user preferences. User preferences can be user selected, e.g. by entering values or by a pull down menu. Optionally, user preferences, needs and/or habits are application-defined based on data accumulated from the user while using the software application over one or more sessions. Optionally, data accumulated is processed by application 205 to characterize a user's habits. Optionally and/or additionally, protocol 210 includes instructions that can be called by API calls 250 for changing one or more operational parameters and/or operational modes responsive to user requests or actions, or due to receiving information indicating low battery life or other characteristics of the computing platform. Optionally, protocol 210 is provided by a supplier of digitizer system 10 and is called by API calls 250. It is appreciated that protocols 210 can either be dedicated to a specific application 205 or alternatively can be loaded, called and/or shared by a plurality of applications 205.

According to some embodiments of the present invention, protocol 210 defines instructions that are communicated through a driver 260 and over a designated interface 124, e.g. USB, SPI or I²C. According to some embodiments of the present invention, software or firmware stored in digital unit 120 includes a protocol implementer 220 for converting instructions received from protocol 210 through interface 124 into commands that can be used for updating operational parameters 130 defined by digital unit 120 and/or analog unit 166, e.g. including a plurality of ASICs 16 in electrical contact with conductive lines of sensor 100. It is appreciated that digital unit 120 and/or analog unit 166 may represent and/or may be replaced by a plurality of digital and/or analog units respectively that together operate as a controller for digitizer system 10.

Typically, digital unit 120 includes firmware and/or software with instructions for operating sensor 100 in a plurality of different modes and/or for activating a plurality of different algorithms for processing output sampled by analog unit 166. According to some embodiments of the present invention, different modes for operating sensor 100 and/or different algorithms for processing output sampled by analog unit 166 are selected and/or activated on per need basis. In some exemplary embodiments, need is defined by protocol 210 as specified by an application provider. Optionally, an application provider can provide instructions that incorporate user preferences and/or power management considerations. A non-exhaustive exemplary list of software applications that may include API 255 and/or API calls 250 using protocol 210 includes word processing applications, drawing applications, gaming applications, internet browsing applications, e-mail applications, spreadsheet applications, navigation applications, data processing applications, social networks applications, power management applications, phone dialing applications, messaging applications, security and/or signature verification applications, handwriting recognition applications, translation applications, data consuming or processing applications, image processing or displaying applications, audio processing or playing applications, video processing or playing applications, electronic books applications, news applications and price comparison applications. Typically, driver 260 allows one active application 205 to transfer instructions to digital unit 120 at a time, and/or coordinates instructions provided by more than one application 205.

A non-exhaustive exemplary list of instructions and/or types of instructions that can be supported by protocol 210 of software application 205 and/or protocol 220 of digital unit 120 includes:

Detect both stylus and fingertip,
Detect only stylus input,
Detect only fingertip input,
Operate sensor 100 in single touch mode and/or in multi-touch mode,
Detect up to N simultaneous touches (N is defined number),
Detect only stylus/finger in a predefined region A on sensor 100,
Operate with high/medium/low refresh rate for finger input and/or high/medium/low refresh rate for stylus input,
Operate with high/medium/low latency for stylus input and/or high/medium/low latency for finger input,
Activate/Suppress hover detection for stylus input and/or finger input,
Activate/Suppress gesture detection for stylus input and/or finger input,
Activate/Suppress smoothing algorithms for stylus input and/or finger input,
Activate/Suppress palm detection for stylus input and/or finger input,
Operate with low, medium or high resolution for stylus input and/or finger input,
Specify low/medium/high resolution in a predefined region B on sensor 100,
Sampling output of sensor 100 with M number of bits (M is a defined number),
Operate in power save mode.

According to some embodiments of the present invention, protocol implementer 220 of digital unit 120 may update one or more parameters based on instruction from application 205. For example in response to instructions to activate smoothing algorithms, digital unit 120 may decrease the refresh rate and/or increase latency to allow ample time for the smoothing algorithms to operate.

Reference is now made to FIG. 3, showing a simplified flow chart of an exemplary method for dynamically customizing operation of a touch screen in accordance with some embodiments of the present invention. According to some embodiments of the present invention, at start-up of a host computer 122 (block 310), digitizer system 10 operates with default parameters, e.g. a default setting (block 315). Typically, default settings are defined at manufacturing site. Typically, the default setting is defined responsive to an expected primary use for the electronic device, e.g. for gaming, web browsing, and/or data entry, and/or if the electronic device is expected be used with a stylus and/or with fingertip touch. In some exemplary embodiments, software for operating the digitizer system updates a default setting over time based on accumulated data derived from a user(s) operating the electronic device. In some exemplary embodiments, the default settings can be manually changed by a user, e.g. by activating a dedicated driver and/or software for operating the touch screen.

According to some embodiments of the present invention, during operation of the electronic device, the digitizer system periodically checks if new instructions have been received (block 320). Alternatively, new instructions may be received by a "push" mechanism, for example using interrupts. Typically, new instructions are initiated by a software application running on host computer 122, responsive to activation or to operation of the software. According to some embodiments of the present invention, once the instructions are received, digitizer system 10 updates its operation responsive to the new instructions (block 325). According to some embodiments of the present invention, digitizer system 10 continues to check for new instructions throughout its operation (block 330). Optionally, digitizer system 10 only checks for new instructions during a period that a user is interacting with sensor 100 and/or stops checking during blanking of the associated display. Optionally, as long as the display is not in a sleep mode and/or a hibernating mode, digitizer system 10 checks for new instructions. Optionally, the frequency for checking is increased while a user interacts with sensor, e.g. while input is received from sensor 100. Optionally, a software application may provide new instructions, e.g. change initial instructions during its operation, e.g. while a user is interacting with the software. Optionally, new instructions are provided responsive to a user changing a type of input to the software application, e.g. switching from entering input with a virtual keyboard to entering free-style input for drawing. Optionally, a software application may provide a first set of instructions responsive to activating a window displaying a virtual keyboard and another set of instructions responsive to the user that window or opening another window, e.g. a window of entering free style text. Optionally, a software application may alter instructions responsive to a current position of a user interaction, e.g. fingertip or stylus. For example, while a fingertip is presently positioned in an area designated for entering free style text, one set of instructions is provided and while the finger positioned in an area designated for selecting one or more virtual buttons another set of instructions is provided. Typically, digitizer system 10 will continue to operate in a current setting if no new instructions are received (block 335). In some exemplary embodiments, instructions are sent to digitizer system 10 to revert back to its default setting when a software application that was previously active was closed and/or deactivated.

It is expected that during the life of a patent maturing from this application many relevant mediums for providing communication between software applications and INPUT/OUTPUT devices will be developed and the scope of the terms herein for describing these mediums is intended to include all such new technologies a priori.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method comprising:
   operating a digitizer system in a first mode of operation for detecting multi-touch fingertip and/or stylus, the first mode of operation associated with one or more processing routines performed by the digitizer system for processing data sampled from a digitizer sensor of the digitizer system, wherein the digitizer system is operated with an electronic device including software applications;
   receiving instructions to suspend or activate one of the processing routines to detect multi-touch fingertip and/or stylus, wherein the instructions are defined by a software application, the software application configured to receive input from the digitizer system; and
   updating operation of the digitizer system based on the instructions defined by the software application, wherein the updating includes suspending sampling the digitizer sensor for stylus detection or suspending scanning the digitizer sensor for fingertip detection and wherein the software application is configured to define the instructions based on accumulated data derived over an extended duration of time, the accumulated data characterizing how a user(s) typically operates the electronic device.

2. The method of claim 1, wherein the instructions defined by one software application configured to receive input from the digitizer system is different than the instructions defined by another software application configured to receive input from the digitizer system.

3. The method of claim 1, wherein the instructions defined by a software application change during an operating session of the software application and wherein operation of the digitizer system is updated based on the changes.

4. The method of claim 1, wherein the software application is selected from a group consisting of: word processing application, drawing application, gaming application, internet browsing application, e-mail application, spreadsheet application, navigation application, data processing application, social networks application, phone dialing application, messaging application, security and/or signature verification application, handwriting recognition application, translation application, data consuming or processing application, image processing or displaying application, audio processing or playing application, video processing or playing application, electronic books application, news application and price comparison application.

5. The method of claim 1, wherein the software application is a power management application.

6. The method of claim 1, wherein the digitizer system includes a digitizer sensor formed from a plurality of conductive lines spread over a sensing surface and wherein the digitizer system is configured to alter a routine for triggering the conductive lines of the digitizer sensor based on the instructions defined by the software application.

7. The method of claim 1, wherein the digitizer system is configured to alter a refresh rate of the digitizer system based on the instructions defined by the software application.

8. The method of claim 1, wherein the processing routine is selected from a group including: gesture detection, smoothing algorithms and palm detection.

9. The method of claim 1, wherein the digitizer system is configured to alter a predefined number of simultaneous fingertip touches that is supported for detection based on the instructions defined by the software application.

10. The method of claim 1, wherein the digitizer system is configured to suspend hover detection of one or more of stylus or fingertip based on the instructions defined by the software application.

11. The method of claim 1, wherein the digitizer system is configured to alter number of bits used for sampling analog output based on the instructions defined by the software application.

12. The method of claim 1, wherein the digitizer system is configured to alter resolution of the digitizer system based on the instructions defined by the software application.

13. The method of claim 1, wherein the digitizer system is operated with a mobile phone or a smart phone.

14. An electronic device comprising:
   a controller associated with a host computer configured to receive instructions to suspend or activate one or more processing routines to process data sampled from a digitizer sensor of a digitizer system, the instructions defined by a software application, the software application running on the host computer;
   a controller configured to operate the digitizer system to detect multi-touch fingertip and/or stylus, the controller configured to operate the digitizer system in a first mode of operation and to update operation of the digitizer system based on the instructions by suspending or activating the one or more processing routines to detect multi-touch fingertip and/or stylus based on the instructions defined by the software application; and an interface configured to communicate instructions defined by the software application to the controller configured to operate the digitizer system.

15. An electronic device of claim 14 comprising memory having stored thereon at least two software applications, each defining one or more operating parameters of the digitizer system, wherein at least one of the operating parameters defined by one of the at least two software applications is different than that defined by the other of the at least two software applications.

16. The electronic device of claim 14, wherein the software application is selected from a group consisting of: word processing application, drawing application, gaming application, internet browsing application, e-mail application, spreadsheet application, navigation application, data processing application, social networks application, phone dialing application, messaging application, security and/or signature verification application, handwriting recognition application, translation application, data consuming or processing application, image processing or displaying application, audio processing or playing application, video processing or playing application, electronic books application, news applications and price comparison application.

17. The electronic device of claim 14, wherein the software application is a power management application.

18. The electronic device of claim 14, wherein the digitizer system includes a digitizer sensor formed from a plurality of conductive lines spread over a sensing surface and wherein the controller for operating the digitizer system is configured to alter a routine for triggering the conductive lines of the digitizer sensor based on the instructions defined by the software application.

19. The electronic device of claim 14, wherein the controller configured to operate the digitizer system is configured to alter a refresh rate of the digitizer system based on the instructions defined by the software application.

20. The electronic device of claim 14 wherein the processing routine is selected from a group including: gesture detection, smoothing algorithms and palm detection.

21. The electronic device of claim 14, wherein the controller configured to operate the digitizer system is configured to suspend sampling the digitizer sensor for stylus detection or to suspend scanning the digitizer sensor for fingertip detection based on the instructions defined by the software application.

22. The electronic device of claim 14, wherein the controller configured to operate the digitizer system is configured to alter a predefined number of simultaneous fingertip touches that is supported for detection based on the instructions defined by the software application.

23. The electronic device of claim 14, wherein the controller configured to operate the digitizer system is configured to activate or suspend hover detection of one or more of stylus or fingertip based on the instructions defined by the software application.

24. The electronic device of claim 14, wherein the controller configured to operate the digitizer system is configured to alter number of bits used for sampling analog output based on the instructions defined by the software application.

25. The electronic device of claim 14, wherein the controller configured to operate the digitizer system is configured to alter resolution of the digitizer system based on the instructions defined by the software application.

26. The electronic device of claim 14, wherein the electronic device is a mobile phone or a smart phone.

27. A method comprising:
operating a digitizer system in a first mode of operation for detecting multi-touch fingertip and/or stylus, the first mode of operation associated with one or more processing routines performed by the digitizer system for processing data sampled from a digitizer sensor of the digitizer system, wherein the digitizer system is operated with an electronic device including software applications;
receiving instructions to suspend or activate one of the processing routines to detect multi-touch fingertip and/or stylus, wherein the instructions are defined by a software application, the software application configured to receive input from the digitizer system and wherein the software application is configured to define the instructions based on accumulated data derived over an extended duration of time, the accumulated data characterizing how a user(s) typically operates the electronic device; and
updating operation of the digitizer system based on the instructions defined by the software application.

28. The method of claim 27, wherein the digitizer system is configured to alter a refresh rate of the digitizer system based the instructions defined by the software application.

29. The method of claim 27, wherein the processing routine is selected from a group including: gesture detection, smoothing algorithms and palm detection.

30. The method of claim 27, wherein the digitizer system is configured to alter a predefined number of simultaneous fingertip touches that is supported for detection based on the instructions defined by the software application.

31. The method of claim 27, wherein the digitizer system is configured to suspend hover detection of one or more of stylus or fingertip responsive to the instructions defined by the software application.

* * * * *